United States Patent [19]

Tice

[11] Patent Number: 4,841,801
[45] Date of Patent: Jun. 27, 1989

[54] CONNECTING ROD

[75] Inventor: David A. Tice, Gainesville, Fla.

[73] Assignee: TRW Inc., Lyndhurst, Ohio

[21] Appl. No.: 274,702

[22] Filed: Nov. 15, 1988

Related U.S. Application Data

[63] Continuation of Ser. No. 30,454, Mar. 25, 1987, abandoned.

[51] Int. Cl.[4] ............................................. G05G 1/00
[52] U.S. Cl. ........................... 74/573 R; 123/137 AB;
74/581
[58] Field of Search ............. 74/579 R, 579 E, 579 F,
74/580, 581; 123/197 AB; 29/156.5 A

[56] References Cited

U.S. PATENT DOCUMENTS

| | | | |
|---|---|---|---|
| 2,232,847 | 2/1941 | Geyer | 74/579 R |
| 3,279,278 | 10/1966 | Eldred | 74/579 R |
| 3,362,252 | 1/1968 | Ditlinger | 74/579 R |
| 3,362,253 | 1/1968 | Ditlinger | 74/579 R |
| 3,370,483 | 2/1968 | Ditlinger | 74/579 R |
| 3,388,615 | 6/1968 | Ditlinger | 74/579 R |
| 3,411,379 | 11/1968 | Deyerling | 74/579 R |
| 3,434,372 | 3/1969 | Delker | 74/579 R |
| 3,475,988 | 11/1969 | Ditlinger et al. | 74/579 R |
| 3,532,308 | 10/1970 | Courtney et al. | 74/579 R |
| 3,692,361 | 9/1972 | Ivarsson | 74/579 R X |
| 3,768,334 | 10/1973 | Ditlinger | 74/579 R |
| 3,782,220 | 1/1974 | Ditlinger | 74/581 X |
| 3,977,274 | 8/1976 | Ditlinger | 74/579 R |
| 4,038,885 | 8/1977 | Jonda | 74/579 R X |
| 4,183,261 | 1/1980 | Eiselbrecher et al. | 74/579 R |
| 4,242,048 | 12/1980 | McArdle | 74/579 R X |
| 4,300,410 | 11/1981 | Raghupathi et al. | 74/579 R |
| 4,353,267 | 10/1982 | Robert | 74/579 R |
| 4,403,525 | 9/1983 | Bongers | 74/579 E |
| 4,425,820 | 1/1984 | Swozil | 74/579 E X |
| 4,466,387 | 8/1984 | Perry | 123/197 AB X |
| 4,603,084 | 7/1986 | Drachenberg et al. | 74/579 R X |

FOREIGN PATENT DOCUMENTS

| | | | |
|---|---|---|---|
| 3207573 | 9/1983 | Fed. Rep. of Germany | 74/579 E |
| 0020259 | 2/1979 | Japan | 74/579 R |

*Primary Examiner*—Vinh Luong
*Attorney, Agent, or Firm*—Tarolli, Sundheim & Covell

[57] ABSTRACT

A connecting rod interconnects first and second structures. The connecting rod includes first and second connectors for attachment to the first and second structures. A core is located between the connectors so that the connectors are at opposite ends of the core. A tubular member for resisting movement of the structures toward one another has a plurality of parallel fibers which are disposed about the outer periphery of the core and which extend between opposite ends of the core. A strap extends along the tubular member and around the connectors to form a closed loop for resisting movement of the structures away from one another. Locator caps are disposed between each connector and the tubular member for transmitting force therebetween and for restraining separation of the end portions of the fibers of the tubular member outwardly from the core.

19 Claims, 3 Drawing Sheets

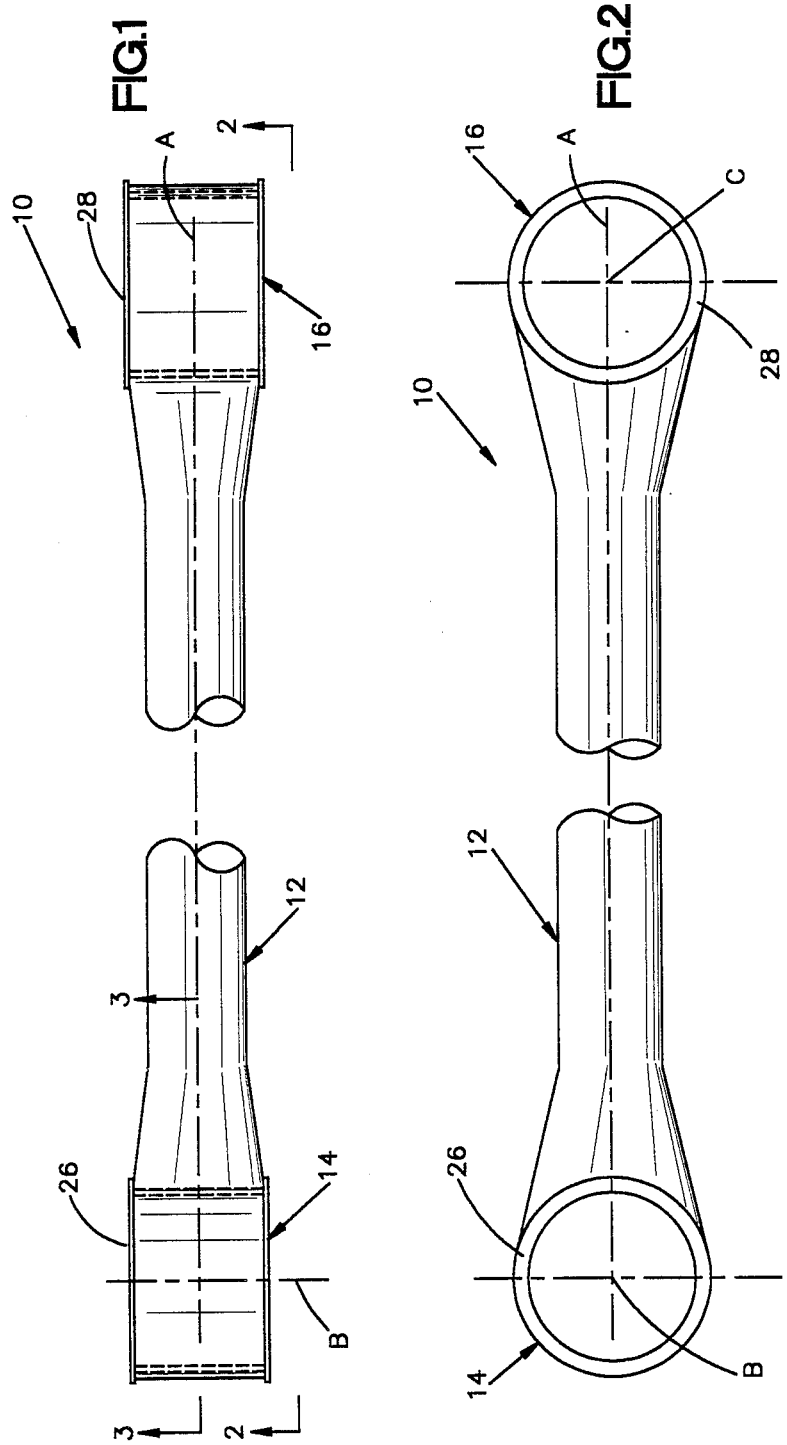

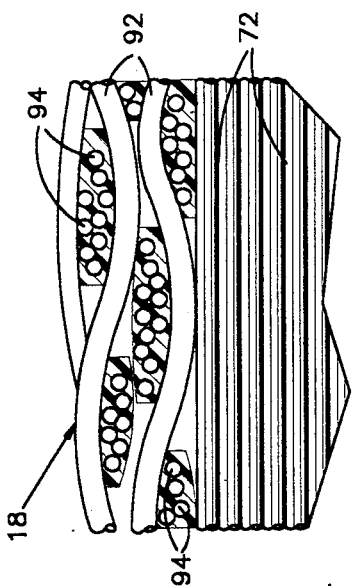
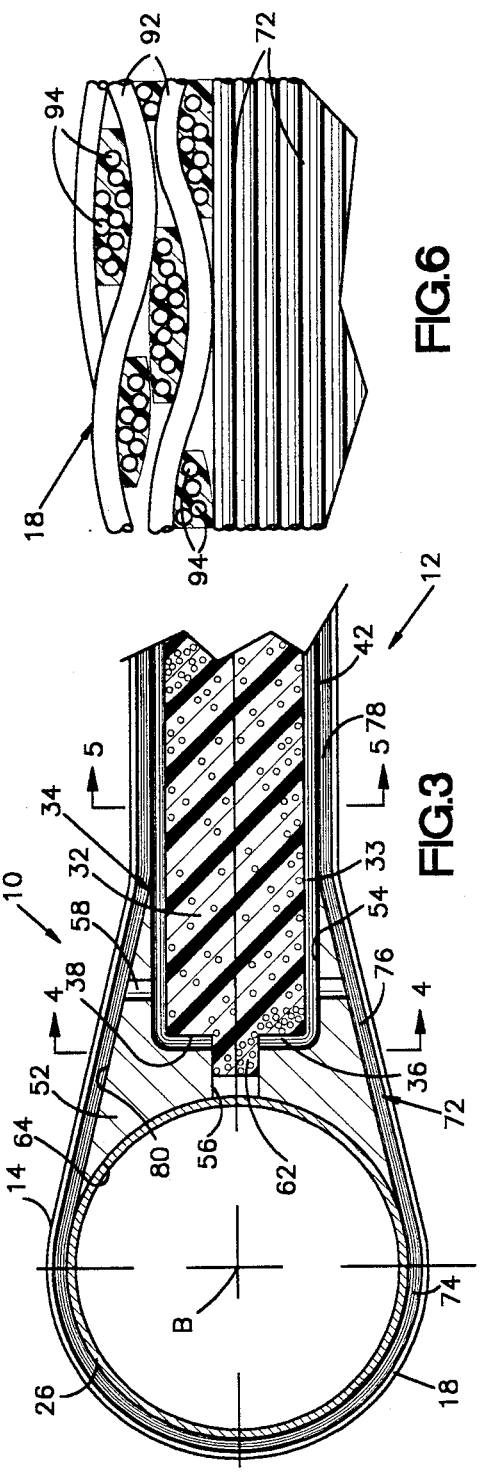
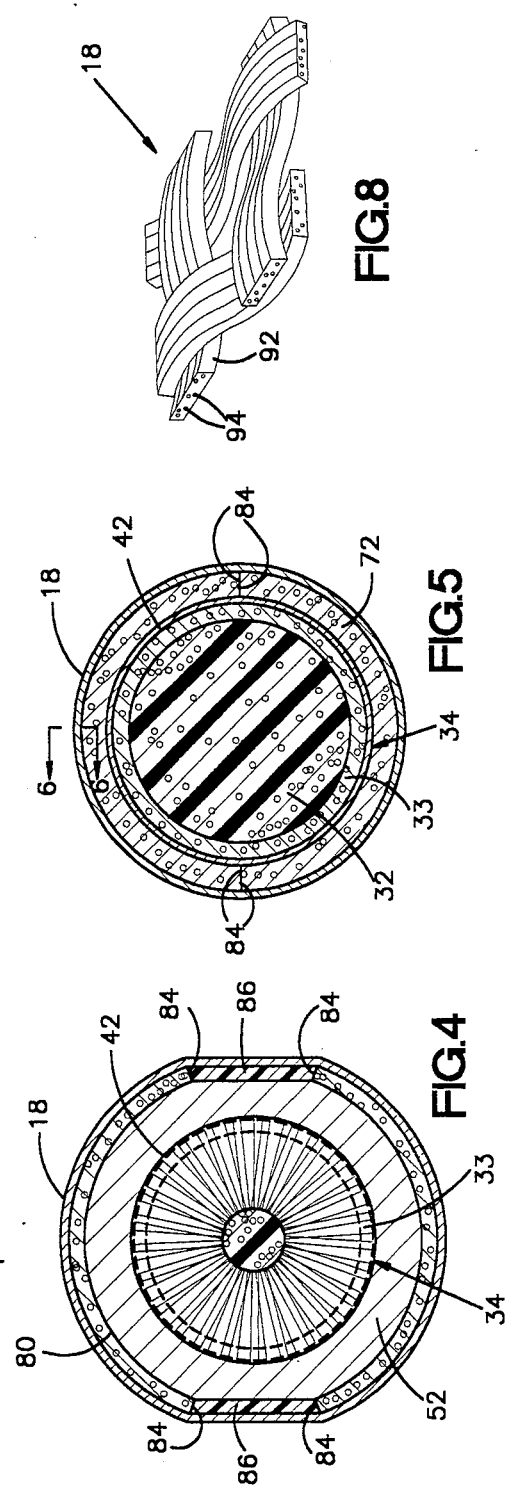

CONNECTING ROD

This is a continuation of co-pending application Ser. No. 030,454, filed on Mar. 25, 1987, abandoned.

BACKGROUND OF THE INVENTION

1. Technical Field

The present invention relates to a connecting rod for interconnecting structures, and particularly relates to a lightweight fiber reinforced composite connecting rod.

2. Description of the Prior Art

Fiber reinforced plastic composite connecting rods are known. The known composite connecting rods typically are used in place of relatively heavy metal connecting rods in automotive and aerospace applications. Two such composite connecting rods are disclosed in U.S. Pat. Nos. 4,183,261 and 4,300,410.

The connecting rods disclosed in U.S. Pat. No. 4,183,261 includes an elongate plastic foam core having boron fibers disposed about the core. The fibers extend in a direction which is parallel to the longitudinal central axis of the core. A pair of bushings are disposed at axially opposite ends of the core. The bushings can be used to attach the connecting rod to other structures. A fiber strap is wound about the bushings and longitudinally over the boron fibers. A fiber "bandage" is wound transversely about the strap between the bushings.

The composite connecting rod disclosed in U.S. Pat. No. 4,300,410 includes a tubular member having reinforcing fibers extending parallel to its longitudinal axis. End caps are received on end surfaces of the tubular member. The end caps receive bushings therein. A fiber strap extends along the tubular member and is wrapped around the bushings.

These known connecting rods perform acceptably when subjected to tensile loading. However, when the connecting rods are subjected to compressive loading, the ends of the fibers located between the bushings may tend to separate outwardly adjacent the bushings, which can result in failure of the connecting rod. Further, these known connecting rods tend to be relatively bulky because the portion of the connecting rod located between the bushings is at least as thick as the outer diameter of the bushings.

SUMMARY OF THE INVENTION

The present invention is a fiber reinforced composite connecting rod in which fibers subjected to compression are restrained from buckling inwardly by a core on which the fibers are carried. The end portions of the fibers are also restricted from separating radially outwardly from the core. The connecting rod of the present invention is relatively less bulky than some of the known fiber reinforced plastic composite connecting rods.

The fiber reinforced composite connecting rod embodying the present invention interconnects first and second structures. The connecting rod includes first and second connectors for attachment to the first and second structures, respectively. A core is located between the connectors so that the connectors are at opposite ends of the core. A tubular member has a plurality of parallel fibers disposed about the periphery of the core and extending between opposite ends of the core. The tubular member resists movement of the structures towards one another. A fiber strap extends along the tubular member and around the connectors to form a closed loop to resist movement of the structures away from one another. A locator cap is disposed between each connector and the tubular member for transmitting compressive forces between the connectors and the tubular member. Each of the locator caps has an opening with a diameter sized so that the cap tightly encircles a respective end portion of the tubular member. The locator caps restrain the end portions of the parallel fibers of the tubular member from separating outwardly from the core.

The core is an elongate member made from a foam plastic material having a longitudinal central axis. The connectors include a pair of tubular bushings, each of which has a longitudinal central axis. The bushings are received on a surface of a respective locator cap. The bushings are disposed so that their longitudinal central axes are transverse to the longitudinal central axis of the core. A braided outer layer covers the fiber strap and both bushings. The portion of the connecting rod located between the bushings has a diameter that is smaller than the outer diameter of the bushings.

BRIEF DESCRIPTION OF THE DRAWINGS

Further features of the present invention will become apparent to those skilled in the art to which the present invention relates from reading the following specification with reference to the accompanying drawings, in which:

FIG. 1 is a view of a connecting rod embodying the present invention;

FIG. 2 is a side elevational view taken approximately along line 2—2 of FIG. 1;

FIG. 3 is an enlarged sectional view taken along line 3—3 of FIG. 1;

FIG. 4 is an enlarged sectional view taken along line 4—4 of FIG. 3;

FIG. 5 is an enlarged sectional view taken along line 5—5 of FIG. 3;

FIG. 6 is an enlarged sectional view taken along line 6—6 of FIG. 5;

FIG. 8 is an enlarged view of the exterior surface of the connecting rod.

DESCRIPTION OF A PREFERRED EMBODIMENT

Figure 7:
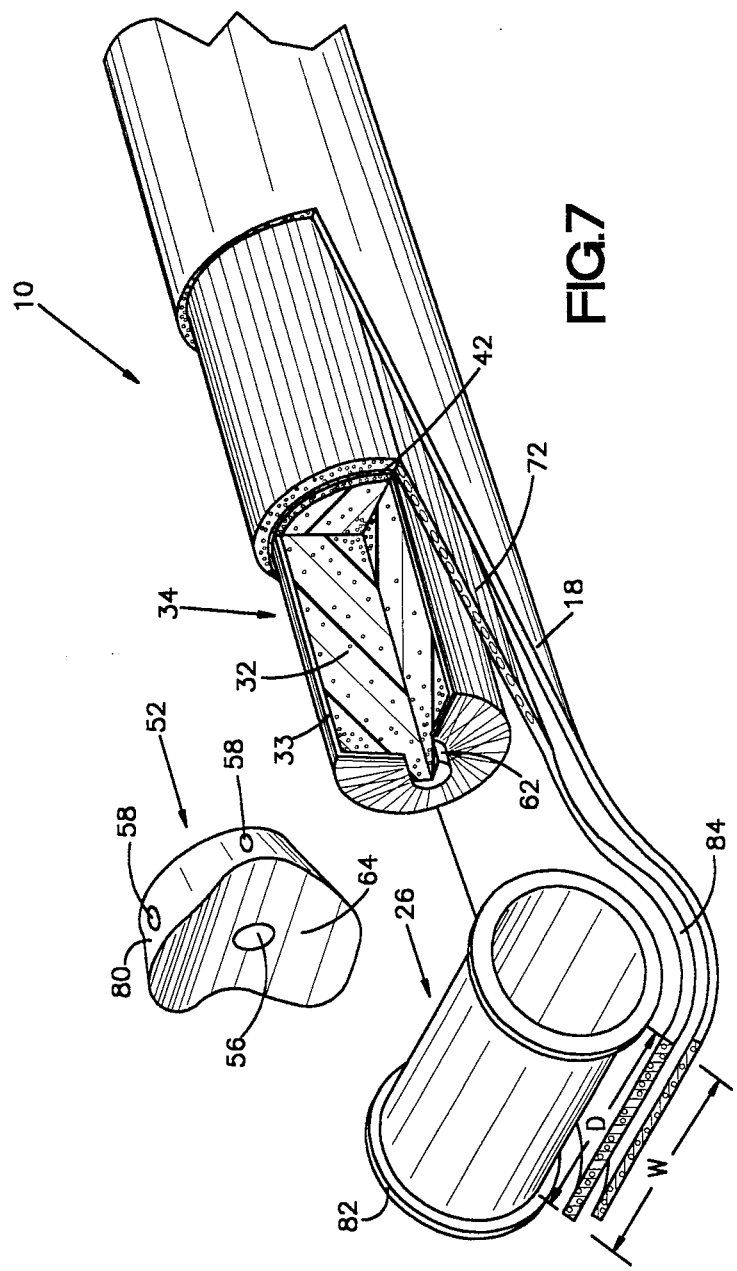
FIG. 7 is a partially exploded perspective view of an end portion of the connecting rod in FIGS. 1 and 2.

A fiber reinforced composite connecting rod 10 embodying the present invention is illustrated in FIGS. 1 and 2. The connecting rod 10 is suitable for many uses that involve interconnecting members or structures and transmitting forces therebetween. The connecting rod 10 is described below as pivotally connecting a vehicle axle housing with a vehicle frame. The description is for purposes of illustration only and is not intended to limit the use of the connecting rod 10.

The connecting rod 10 includes a central body portion 12 with a longitudinal central axis A. End portions 14, 16 are disposed at axially opposite ends of the central body portion. A connector in the form of a tubular bushing 26, 28 is disposed within a respective end portion 14, 16 of the connecting rod 10. Each of the bushings 26, 28 has a respective longitudinal central axis B, C. The longitudinal central axes B, C of the bushings are disposed transversely of the longitudinal central axis A of the connecting rod 10.

The bushing 26 is pivotally connectable with a vehicle frame (not shown) in a known manner. The bushing 28 is pivotally connectable with a vehicle rear axle housing (not shown) in a known manner. The connecting rod 10, thus, interconnects the structures, namely the vehicle frame and the vehicle axle housing, and permits pivotal movement therebetween.

The central body portion 12 of the connecting rod 10 includes a core 32 and a tubular member 34. The core 32 (FIGS. 3 and 7) is located between the bushings 26, 28. The core 32 is an elongate cylindrical member having a longitudinal central axis which corresponds to the longitudinal central axis A of the connecting rod 10. The core 32 is made from a closed cell plastic foam material, such as Rohacell Foam which is marketed by Cyro Industries of Orange, CT. The plastic foam material expands slightly when exposed to temperatures above ambient room temperature and then sets in the expanded condition.

The fiber-resin composite tubular member 34 includes a plurality of fibers 33 disposed about the outer surface of the core 32. The member 34 is bonded to the outer surface of the core by a plastic resin matrix which also binds the fibers 33 to each other. The tubular member 34 transmits compressive forces between the bushings 26, 28 and restricts the bushings from moving toward one another. The fibers 33 of the tubular member 34 are arranged unidirectionally and extend in a direction generally parallel to the longitudinal central axis of the core 32. Each of the fibers 33 is continuous and has a length which is substantially greater than its diameter. Each of the fibers 33 also extends the length of the core 32. End portions 36 of some of the fibers 33 extend over the end surface 38 of the core 32. The fibers 33 are preferably glass but may be of any suitable reinforcing fiber.

The tubular member 34 also includes a braided fiber layer 42 which is woven about the fibers 33 and bonded to the fibers by a plastic resin matrix. The braided fiber layer 42 is primarily to facilitate handling of the core 32 and plurality of fibers 33 during manufacturing. Specifically, the braided fiber layer 42 is used to retain the fibers 33 about the core 32 because the fibers are initially placed about the core dry (without resin) and thus there is nothing to bond the fibers to the core.

The end portion 14 illustrated in FIG. 3 is identical to the end portion 16 in construction. Thus, only the one end portion 14 is described below. A locator cap 52 is disposed at the end of the tubular member 34. The locator cap 52 is preferably made of an aluminum alloy or other suitable material. An opening 54 is formed in the locator cap 52 for receiving an end portion of the tubular member 34. The inner diameter of the opening 54 is sized so that the locator cap 52 tightly encircles the outer circumference of the end portion of the tubular member 34. The cylindrical wall of the opening 54 prevents the braided fiber layer 42 and the plurality of fibers 33 from separating radially outward from the core 32. This assures that the structural integrity of the connecting rod 10 is maintained and that compressive loading is transmitted primarily through the tubular member 34. Thus, the bushings 26, 28 are maintained in a predetermined spaced apart relationship throughout the operational life of the connecting rod 10. The cylinder wall of the opening 54 also restrains relative movement of the locator cap 52 and the end portions of the core 32 and tubular member 34 in a direction transverse to the longitudinal axis A, of the core 32. This aids in preventing buckling of the connecting rod 10.

The locator cap 52 also has formed in it a second opening 56 which has a smaller diameter than the opening 54. The opening 56 is coaxial with the opening 54 and receives a portion 62 of the core 32 which projects axially from the end surface 38 of the core. The projecting portion 62 acts as a pilot to guide the locator cap 52 onto the core 32 and retains the locator cap in place during manufacturing. The projecting portion 62 can be replaced by other known pilot arrangements, such as a dowel pin extending through the opening 56 and into the core 32 or by a bolt extending through the opening 56 and threaded into the core 32.

Passages 58 extend radially through and are spaced circumferentially about the locator cap 52. The passages 58 permit liquid plastic resin to be applied during manufacturing to the portions of the fibers 33 and of the braided layer 42 of the tubular member 34 which are disposed within the opening 54 of the locator cap 52. Once the plastic resin matrix sets it bonds the locator cap 52 to the tubular member 34. Thus, the locator caps 52 transmit compressive force between the bushings 26, 28 and the tubular member 34.

The locator cap 52 also includes a surface 64 which receives and engages the bushing 26 to establish a relative position between the bushing and the tubular member 34 and, ultimately, the other bushing 28. It is this relative position which establishes the distance between the bushings 26, 28 that is desired to be maintained throughout the operational life of the connecting rod 10.

A strap 72 is wrapped tightly about the bushings 26, 28 and tubular member 34 to resist movement of the bushings in a direction away from one another. Thus, the strap 72 transmits tensile forces between the bushings 26, 28. The strap 72 is made from braided glass strands of fibers which are oriented at a very small angle relative to the longitudinal axis A of the connecting rod 10. The strap 72 has a portion 74 which is wrapped about the portion of the bushing 26 which is not engaged by the surface 64 of the locator cap 52. The strap 72 also includes a portion 76 which is disposed about the locator cap 52. The strap 72 further includes a portion 78 which encircles the portion of the tubular member 34 which is not disposed within the locator cap 52.

The locator cap 52 has a tapered functional exterior surface 80. The portion 76 of the strap 72 engages the exterior surface 80 (FIGS. 3 and 4) and is bonded to the surface by a plastic resin matrix. The portion 76 of the strap 72 diverges from the longitudinal axis A in the direction from the portion 78 to the portion 74. The divergence occurs because the outer diameter of the tubular bushing 26 is larger than the outer diameter of the tubular member 34 and of the locator cap 52. Thus, the connecting rod 10 embodying the present invention may be used in applications where a connecting rod having a thicker central body portion connecting bushings cannot be used.

The width W (FIG. 7) of the strap 72 is sized to fit closely within the dimension D existing between flanges 82 which extend radially outward from axially opposite end portions of the bushing 26. Thus, the strap 72 restrains the bushing 26 from moving along its axis B relative to the longitudinal central axis A of the connecting rod 10. The width W of the strap 72 is constant over its length and the edges 84 of the strap 72 abut in the portion 78, as illustrated in FIG. 5. The edges 84 of the strap 72 are spaced apart where portion 76 diverges from portion 78, as illustrated in FIG. 4. A plastic resin matrix material 86 fills the space between the edges 84 of the the strap 72 as illustrated in FIG. 4.

The exterior surfaces of the central body portion 12 and the end portions 14, 16 of the connecting rod 10 (FIGS. 1 and 2) are covered with a braided outer layer 18 (FIGS. 6 and 8). The outer layer 18 maintains the tubular member 34, locator caps 52, strap 72 and bushings 26, 28 of the connecting rod 10 in place. The outer layer 18 also provides the connecting rod 10 with torsional strength.

The outer layer 18 is braided over the exterior surface of the strap 72. The outer layer 18 includes a plurality of strands 92 which are braided or woven in a known manner about the surface of the connecting rod 10. Each strand 92 is preferably made of a plurality of glass fibers 94, or other suitable reinforcing fibers. The fibers 94 extend continuously throughout the length of the strand 92. The fiber strands 92 are woven in a pattern in which each of the strands extend at an angle of approximately 45° relative to a longitudinal central axis A of the connecting 10 rod, although other angles are may be used.

The outer layer 18 is bonded to the other parts of the connecting rod 10 by a plastic resin matrix. The plastic resin matrix bonds all of the parts of the connecting rod 10 together. The plastic resin matrix is applied after the parts of the connecting rod 10 are assembled. The plastic resin matrix preferably cures at room temperature. The plastic foam of the core 32 expands slightly upon the application of heat above ambient room temperature, generally 72° F, due to the curing of the plastic resin matrix. The core 32 sets in its expanded size. This tends to tighten all of the parts of the connecting rod 10 together as the plastic resin matrix and the plastic foam of the core 32 set. Thus, the braided fiber layer 42, the tension strap 72 and outer layer 18 all aid in preventing radially outward buckling of the fibers 33 of the tubular member 34. The core 32 prevents radially inward buckling of the fibers 33. The locator caps 52 prevent the end portions of the fibers 33 from separating outwardly from the core 32.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, the following is claimed:

1. A connecting rod for interconnecting first and second structures, said connecting rod comprising:
   a first connector for attachment to the first structure;
   a second connector for attachment to the second structure;
   a core located between said first and second connectors so said first and second connectors are located at axially opposite ends of said core;
   a tubular member for resisting movement of said first and second connectors toward each other, said tubular member having a plurality of parallel fibers disposed about the outer periphery of said core and which fibers extend in a direction between the axially opposite ends of said core;
   a strap extending along said tubular member and around said first and second connectors to define a closed loop for resisting movement of said first and second connectors away from each other; and
   means disposed between said tubular member and each of said first and second connectors for transmitting a force between said tubular member and said first and second connectors which force tends to move said first and second connectors toward each other and for restraining end portions of said plurality of parallel fibers of the tubular member against separating outwardly from said core, said means including a locator cap having a first opening for receiving an end portion of said tubular member.

2. The connecting rod set forth in claim 1 wherein said locator cap includes a surface for engaging one of said first and second connectors to establish the position of said one connector relative to said tubular member.

3. The connecting rod set forth in claim 1 wherein the first opening of said locator cap is defined by a surface which tightly encircles said end portion of said tubular member.

4. The connecting rod set forth in claim 1 further including means for positioning said locator cap relative to said tubular member, said means for positioning said locator cap includes a projection extending from an end of said core and which projection is received in a second opening in said locator cap.

5. A connecting rod for interconnecting first and second structures, said connecting rod comprising:
   a first connector for attachment with the first structure;
   a second connector for attachment with the second structure;
   first means for resisting movement of said first and second connectors away from each other when said first means is placed in tension by a force urging said first and second connectors to move away from each other;
   second means for resisting movement of said first and second connectors toward each other when said second means is placed in compression by a force urging said first and second connectors to move toward each other, said second means comprising a core and a tubular member having a plurality of parallel fibers disposed about said core which fibers extend in a direction between axially opposite ends of said core, said first and second connectors being located at the axially opposite ends of said tubular member; and
   third means disposed between said second means and each of said first and second connectors for transmitting force between said second means and said first and second connectors and for limiting deformation of end portions of said tubular member outwardly, said third means including a pair of locator caps, each one of said pair of locator caps having an opening for receiving a respective end portion of said tubular member and a surface for engaging a respective one of said first and second connectors to transmit force between said tubular member and said connectors, the opening in each locator cap being defined by a surface which tightly encircles a respective end portion of said tubular member.

6. The connecting rod set forth in claim 5 wherein said first means includes a fiber reinforced strap extending about said second means and said first and second connectors defining a closed loop.

7. A connecting rod for interconnecting first and second structures, said connecting rod comprising:

a first connector for attachment with the first structure;

a second connector for attachment with the second structure;

a core having a longitudinal central axis and being located between said first and second connectors, said first and second connectors being located at axially opposite ends of said core;

a tubular member for resisting movement of said first and second connectors toward each other, said tubular member comprising a plurality of parallel fibers which are disposed about the outer periphery of said core and which extend in a direction substantially parallel to the longitudinal central axis of said core;

a fiber strap extending along said tubular member and around said first and second connectors to define a closed loop for resisting movement of said first and second connectors away from each other;

means located between said tubular member and each of said first and second connectors for transmitting a force between said tubular member and each of said first and second connectors when the force tends to move said first and second connectors toward one another; and means tightly encircling the outer periphery of axial end portions of said tubular member for restraining all of said plurality of parallel fibers in the axial end portions of said tubular member against separating from said core during the application of the force tending to move said first and second connectors toward one another.

8. The connecting rod set forth in claim 7 wherein said force transmitting means comprises a locator cap having a surface for engaging one of said first and second connectors and a surface for engaging an axial end of said tubular member to establish the axial position of said one connector relative to said tubular member and wherein said restraining means comprises surface means defining an opening in said locator cap for receiving an axial end portion of said tubular member.

9. The connecting rod set forth in claim 8 further including means for positioning said locator cap relative to said tubular member, said means for positioning said locator cap comprises surface means defining a second opening in said locator cap and a projection extending from an axial end of said core received in the second opening in said locator cap.

10. The connecting rod set forth in claim 8 further comprising a resin matrix bonding said strap to said tubular member, bonding said strap to said first and second connectors and bonding said locator cap to said tubular member.

11. The connecting rod set forth in claim 7 wherein said core is formed of a plastic foam material, said plastic foam material being expandable upon the application of heat above ambient room temperature and which thereafter sets in the expanded condition.

12. The connecting rod set forth in claim 7 further comprising a braided outer layer of fibers covering the exterior surface of said strap, each of the fibers of said braided outer layer being disposed at an acute angle relative to the longitudinal central axis of said core, said braided outer layer resists rotational movement of said first and second connectors about the longitudinal central axis of said core and resists movement of the fibers of said strap in a direction outwardly from said core when said connectors are subjected to the force tending to move said connectors toward one another.

13. The connecting rod set forth in claim 7 wherein each of said connectors includes a tubular bushing having a longitudinal central axis which extends in a direction transversely to the longitudinal central axis of said core.

14. The connecting rod set forth in claim 13 wherein each of said bushing and said tubular member have a circular cross section taken in a plane perpendicular to their respective longitudinal central axis and wherein said bushing has an outer diameter greater than the outer diameter of said tubular member and said strap diverges outwardly relative to the longitudinal central axis of said core as said strap extends from said tubular member toward said first and second connectors.

15. The connecting rod set forth in claim 13 further including a pair of axially spaced flanges extending radially from said bushing for receiving said strap therebetween to restrict movement of said bushing relative to said strap in a direction parallel to the longitudinal central axis of said bushing.

16. The connecting rod set forth in claim 7 further including a braided fiber layer covering said plurality of parallel fibers of said tubular member.

17. A connecting rod for interconnecting first and second structures, said connecting rod comprising:

a core having a longitudinal central axis and comprising a one-piece elongate member;

a first connector located at one axial end of said core and for attachment with the first structure;

a second connector located at the other axial end of said core and for attachment with the second structure;

a member for resisting movement of said first and second connectors toward each other, said member comprising a plurality of parallel fibers disposed about the outer surface of said core which extend in a direction substantially parallel to the longitudinal central axis of said core;

a fiber strap extending along said member and around said first and second connectors to define a closed loop for resisting movement of said first and second connectors away from each other;

means disposed between said member and each of said first and second connectors for transmitting a force between said member and each of said first and second connectors when the force tends to move said first and second connectors toward one another; and means tightly encircling the outer periphery of axial end portions of said member in a plane extending perpendicular to the longitudinal central axis of said core for restraining all of said plurality of parallel fibers in the axial end portions of said member from moving away from said core during the application of the force tending to move said first and second connectors toward one another.

18. The connecting rod set forth in claim 17 wherein said core has a circular cross section in a plane extending perpendicular to the longitudinal central axis of said core and said restraining means comprises a cap having an opening for receiving an end of said core and said member.

19. The connecting rod set forth in claim 18 wherein said member is tubular and extends coaxially about said core.

* * * * *